(12) United States Patent
Becker et al.

(10) Patent No.: US 6,347,110 B1
(45) Date of Patent: Feb. 12, 2002

(54) CHARGING DEVICE FOR LOW BLAST FURNACES

(75) Inventors: Lutz Becker, Duisburg; Bertram Rupietta, Oberhausen, both of (DE)

(73) Assignee: SMS Demag AG, Düsseldorf (DE)

( * ) Notice: Subject to any disclaimer, the term of this patent is extended or adjusted under 35 U.S.C. 154(b) by 0 days.

(21) Appl. No.: 09/622,274
(22) PCT Filed: Feb. 3, 1999
(86) PCT No.: PCT/DE99/00334
§ 371 Date: Aug. 30, 2000
§ 102(e) Date: Aug. 30, 2000
(87) PCT Pub. No.: WO99/41561
PCT Pub. Date: Aug. 19, 1999

(30) Foreign Application Priority Data

Feb. 13, 1998 (DE) ........................................ 198 07 616

(51) Int. Cl.$^7$ ................................................. F27D 3/00
(52) U.S. Cl. ............................. 373/79; 373/9; 373/78; 373/81
(58) Field of Search ............................. 373/2, 8, 9, 60, 373/63, 71, 73, 77, 78, 79, 80, 81, 83, 84

(56) References Cited

U.S. PATENT DOCUMENTS

| 4,466,104 A | * | 8/1984 | Walzel | 373/78 |
| 4,506,370 A | * | 3/1985 | Yoshimatsu | 373/8 |
| 4,736,383 A | * | 4/1988 | Meierling | 373/78 |
| 4,740,989 A | * | 4/1988 | Steipe et al. | 373/2 |
| 5,153,894 A | * | 10/1992 | Ehle et al. | 373/80 |
| 5,390,212 A | * | 2/1995 | Bonnet et al. | 373/79 |
| 5,533,043 A | * | 7/1996 | Forestier | 373/9 |
| 5,581,574 A | * | 12/1996 | Vice | 373/80 |
| 5,898,726 A | * | 4/1999 | Matsumoto et al. | 373/80 |
| 6,157,665 A | * | 12/2000 | Benedtti et al. | 373/79 |
| 6,201,826 B1 | * | 3/2001 | Giannoulidis et al. | 373/78 |

* cited by examiner

Primary Examiner—Tu Ba Hoang
(74) Attorney, Agent, or Firm—Cohen, Pontani, Lieberman & Pavane

(57) ABSTRACT

A feeding device for low shaft furnaces, in particular for arc furnaces for melting scrap, it being possible for the furnaces to be closed by a cover connected to a gas-extracting device, and it being possible for a charging apparatus to be set down on the furnaces once the cover has been removed from the furnace shaft. The charging apparatus has a top part and a bottom part. The top part is configured as a charging container which has a gas-permeable base which can be opened, and, in the region of its mouth, the bottom part is configured such that it corresponds with the top border of the upper furnace vessel. Provided outside the low shaft furnace is a bearing on which the charging apparatus can be set down and of which the level is considerably lower than that of the top border of the upper furnace vessel. The bearing has a connection by which it can be connected to the gas-extracting device. Also provided is a lifting apparatus by which the charging apparatus can be set down on the bearing means and lifted to a height slightly above the level of the top border of the upper furnace vessel. A moving apparatus is provided to more the charging apparatus toward and away from the low shaft furnace.

14 Claims, 6 Drawing Sheets

CHARGING DEVICE FOR LOW BLAST FURNACES

BACKGROUND OF THE INVENTION

1. Field of the Invention

The invention relates to a feeding device for low shaft furnaces, in particular for arc furnaces for melting scrap, it being possible for the furnaces to be closed by a cover connected to a gas-extraction device, and it being possible for a charging apparatus to be set down on the furnaces once the cover has been removed from the furnace shaft.

2. Discussion of the Prior Art

EP 0 385 434 B1 discloses a smelting unit with an arc furnace which contains a furnace vessel, comprising a furnace bottom and a vessel wall, and a vessel cover. A shaft-like charging-material preheater is arranged laterally on the furnace vessel, and a lifting apparatus is fastened on a displaceable portal arranged alongside the charging-material preheater. The lifting apparatus contains at least one liftable and lowerable carrying element which acts on the border of the cover. The displaceable portal is designed as a rotary portal.

DE 40 15 916 A1 discloses a smelting unit with two smelting furnaces arranged one beside the other, each furnace being assigned a shaft which is of more or less rectangular design in plan view and has a widening interior in the downward direction. The shaft can be closed by means of a cover and, in the process, can be displaced horizontally, e.g. on rails. In the open state of the shaft, feed material can be charged into the shaft by means of a charging-material container.

Furthermore, DE196 26 389 discloses an arc furnace in which, accessible from one side of the furnace vessel and screened thermally from the furnace interior, is provided an electrode-receiving space with at least one through-passage opening for the electrode, said opening being oriented toward the furnace interior. In this case, the furnace vessel may be made up of a bottom part and a top part, the top part then having the recess which forms the electrode-receiving space. The bottom termination of the convexity is provided with a base plate which has a through-passage opening for the electrode.

SUMMARY OF THE INVENTION

With the purpose of filling the charging container, in the case of the above-mentioned devices, the material-feeding elements have to be routed to above the border of the charging shaft. If use is made here of a scrap basket moved by a crane, it is necessary to provide a corresponding overall height for the crane track and the workshop. The invention has the object of providing a feeding device for low shaft furnaces, in particular for arc furnaces, which requires only a low workshop height and, while being of straightforward low-maintenance design, makes possible uniform distribution of the charge in the furnace shaft in an operationally reliable manner, with low energy losses and while utilizing to the greatest possible extent the thermal energy present.

The invention proposes a feeding device which comprises a charging apparatus which can be set down, alongside the low shaft furnace, on a bearing means and can be set down on the furnace shaft via moving apparatuses, in particular a pivoting and lifting apparatus. The charging apparatus can be set down more or less as desired during the phase in which the arc furnace is in operation with the result that the material-feeding device for the charging container may be arranged at as low a level as possible in the steelworks workshop. For the purposes of charging the low shaft furnace, the charging apparatus is lifted from the rest position and brought into its filling position, said apparatus being kept above the shaft of the low shaft furnace precisely at such an extent that the respective mouths do not come into contact but, at the same time, as few waste gases as possible pass out of the furnace shaft into the atmosphere.

In the rest position, the charging apparatus is connected to the flue-gas extracting device of the low shaft furnace and thus serves as a pre-heating station. The scrap has the hot gases flowing through it in the preheating chamber from above. This flow direction of the gas advantageously protects the scrap restraining apparatus to the greatest possible extent against thermal overload. The bearing means is designed as an afterburning chamber here.

According to the invention, the low shaft furnace and the scrap preheater are thus arranged independently of one another. Once the charging apparatus has been pivoted away from the furnace, the latter, in particular in the case of possible malfunctioning of the scrap preheater, is operated as a normal arc furnace.

The charging apparatus has a top part and a bottom part. The top part has a rectangular configuration and can be closed by moveable elements at its end which is directed toward the bearing means and or the furnace. In the closed state, the base which is formed in this way is gas-permeable and configured such that no charge falls through it. In an advantageous configuration, there are provided single-armed levers which are fastened on shafts in a pivotable manner.

For the purposes of damping the kinetic energy of the charge during filling of the charging container, there may be provided damping elements on which the tips of the pivotable levers are supported during the filling phase. In an advantageous configuration these damping elements are constructed from a spring element and a pivotable arm.

In the mouth region, the bottom part of the charging apparatus is in a form which corresponds with the top border of the shaft of the low shaft furnace. The form of the top border of the bearing means is adapted to this configuration.

In another advantageous configuration, the gas-permeable base is formed from bars which are plugged through the lateral wall of the charging container and can be pushed in or drawn out through said wall. For the purpose of damping the impact energy during filling, the free opening of the bearing means may be covered by a grid on which the bars are supported.

If the gas-permeable base comprises bars, the charging apparatus has a relatively low overall height and, with the exception of its bottom cover-like border, is of rectangular design.

The charging apparatus is lifted by a lifting apparatus from its bearing means to a height above the border of the low shaft furnace. In order to be moved into a position just above the shaft, use is made of a moving or pivoting apparatus. If a pivoting apparatus is used, an advantageous configuration makes use of a central column which contains elements for lifting and pivoting purposes.

In a further specific configuration, there is provided on the pivoting apparatus a fork-shaped element on which there are arranged at least three lifting elements, preferably hydraulic piston/cylinder units, by means of which the lifting movement is functionally separated from the pivoting movement.

A further separation of the lifting and moving functions is provided for in a configuration in which traveling mechanisms are used, to be precise, a horizontal traveling mechanism for moving the charging container back and forth between the low shaft furnace and the bearing means and a vertical traveling mechanism for raising and lowering from the low level of the bearing means to the higher level above the shaft of the low shaft furnace. Apart from during the brief phase in which the charging container is moved, both the furnace and the charging container are connected to the gas-extracting device. If a pivoting device is used, at least one gas-line section is provided at its top side, said gas-line section being routed at right angles and being capable of being brought into positions in which the low shaft furnace can be connected to the charging container or to the gas-extracting device or else in which there is no connection at all.

BRIEF DESCRIPTION OF THE DRAWINGS

An example of the invention is set out in the attached drawing, in which.

DETAILED DESCRIPTION OF THE PREFERRED EMBODIMENTS

Figure 1:
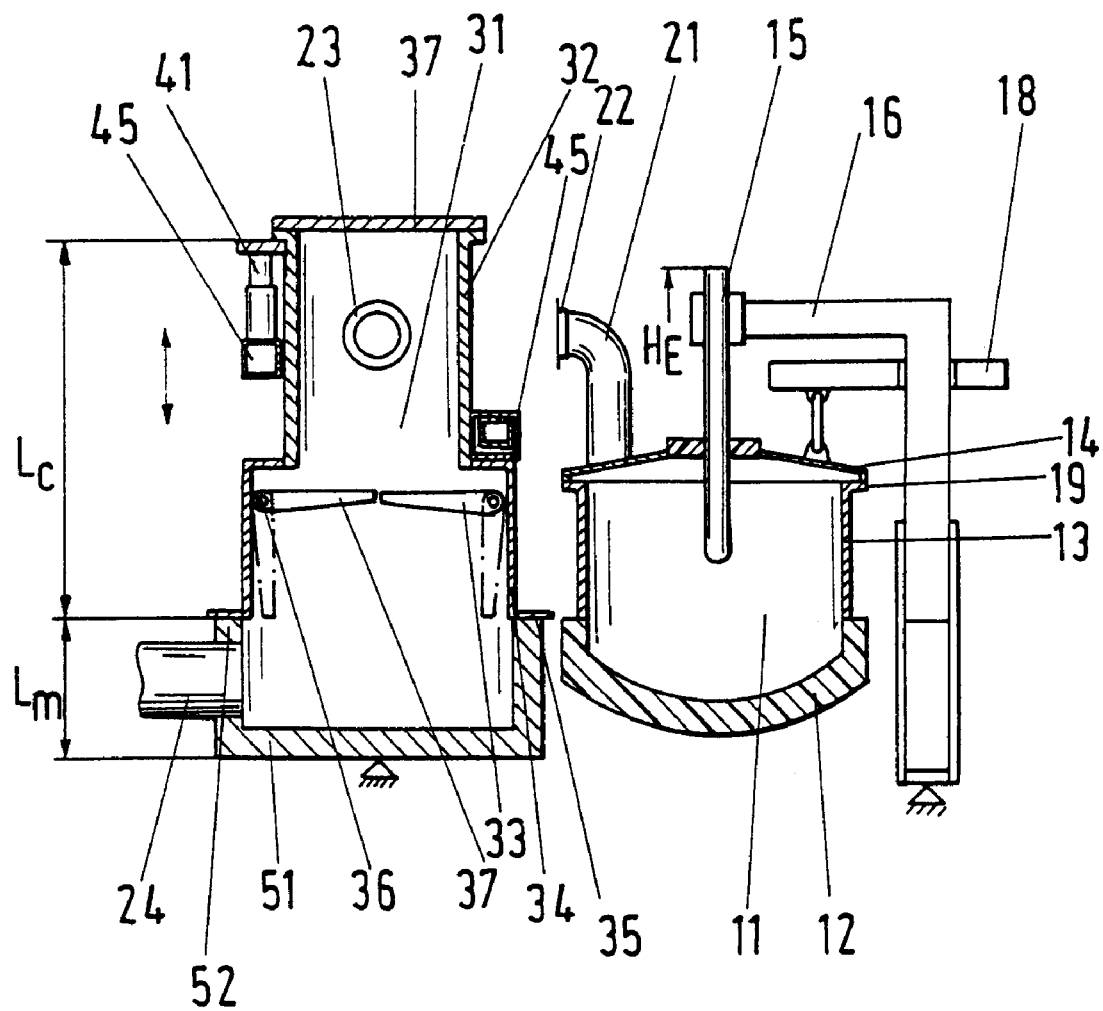
FIG. 1 shows an overview of the low shaft furnace and charging apparatus arrangement.

FIG. 1 shows a low shaft furnace 11 which is constructed from a lower vessel 12 and an upper vessel 13 and can be closed by a cover 14. Projecting through the cover 14 into the upper vessel 13 is an electrode 15 which is fastened on an electrode arm 16 which can be lifted and pivoted by an electrode column.

The cover 14 is fastened on a cover-lifting and -pivoting apparatus 18. Also arranged on the cover 14 is an extracting tube 21 which has a sliding sleeve 22 at the top.

Provided independently of the furnace 11 is a bearing means 51 on which there is arranged a connection 24 which is connected to a gas-extracting device 29 (not illustrated any further).

On the border 52 of the bearing means 51, a charging apparatus 31 is set down by way of the mouth 35 of its bottom part 34. The bottom part 34 is connected to a top part 32 which can be closed in a gastight manner by a cover 38. Furthermore, the top part 32 of the charging container 31 has a feed tube 23 which can be brought into connection with the extracting tube 21 on the furnace cover 14.

The mouth of the top part 32 can be closed by adjustable, single-armed levers 37, which can be pivoted by shafts 36 and form the base 33 of the charging container.

Acting on the charging container 31 are fork-shaped elements 45 by means of which said container can be moved. On the left-hand side of the charging container illustrated in FIG. 1, a lifting apparatus 41 is arranged between the fork-shaped element 45 and the top part 32 of the charging apparatus 31.

If the overall height of the low shaft furnace, that is to say the clear distance within which, for example, a crane can move, is designated $H_E$, then the charging apparatus can be set down with its overall height $L_c$ on the bearing means 51 which itself has a lateral-surface length $L_m$ and may then be arranged at this height within the steelworks workshop.

If it is prohibited for the crane to move over the closed arc furnace with the scrap basket suspended on it, then this height can be reduced to the overall height of the shaft $H_s$.

In the last-mentioned case, it is possible for the scrap basket to be routed at an extremely low level in the steelworks workshop and to fill the arc furnace directly or—in normal operation—the charging apparatus. In this case, the bottom edge of the charging apparatus has to be lifted precisely to the extent where its mouth can be kept above the shaft mouth.

Figure 2:
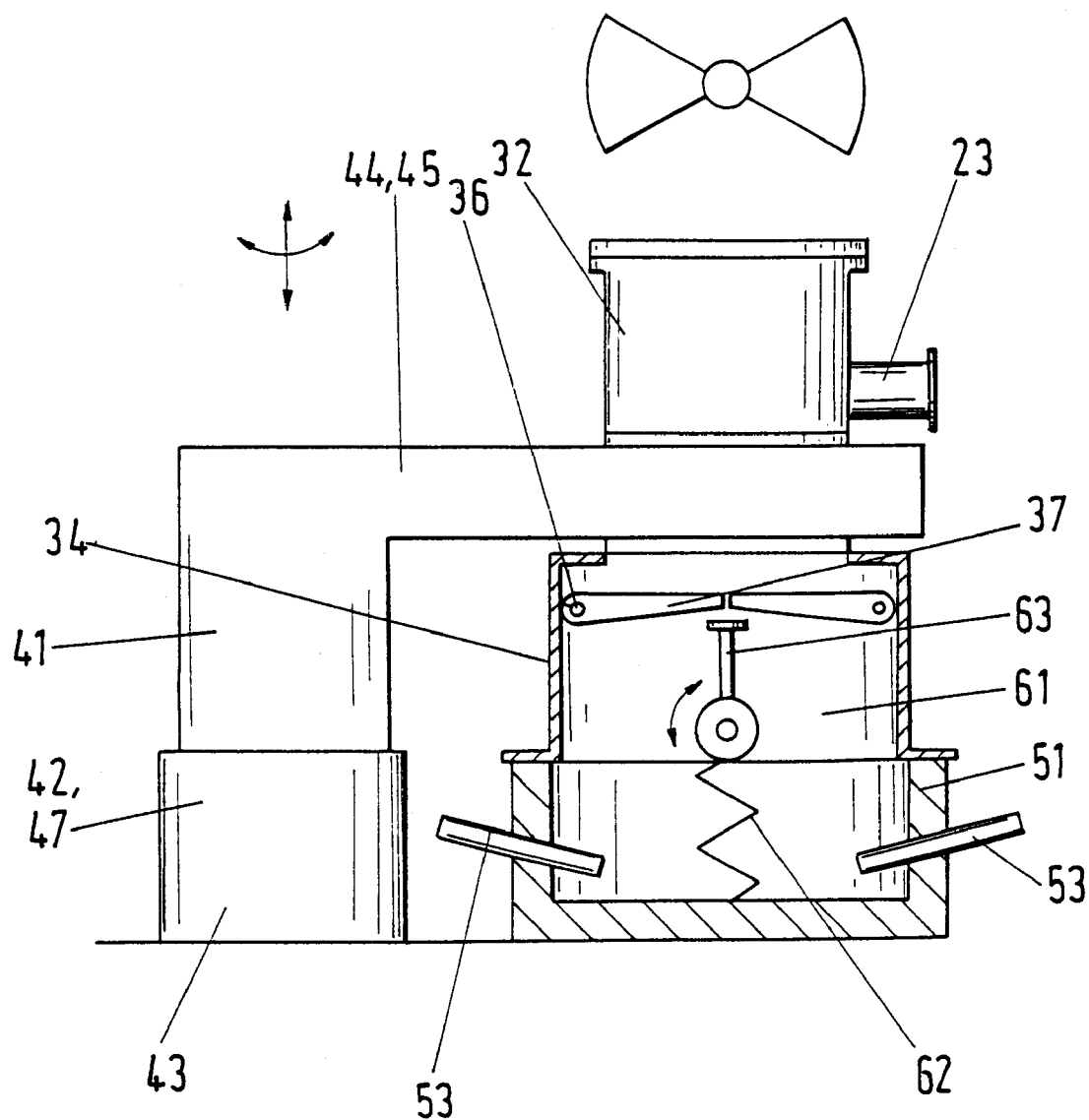
FIG. 2 shows a charging apparatus with a lifting and pivoting apparatus.

FIG. 2 shows a moving apparatus 42 which has a central column 43 and is configured as a pivoting apparatus 47 and, at the same time, as a lifting apparatus 41. The moving apparatus 42 has gripping elements 44 which are configured as a fork-shaped element 45 and grip the top part 32 of the charging apparatus 31. The top part 32 has a feed tube 23 in its side wall.

Figure 6:
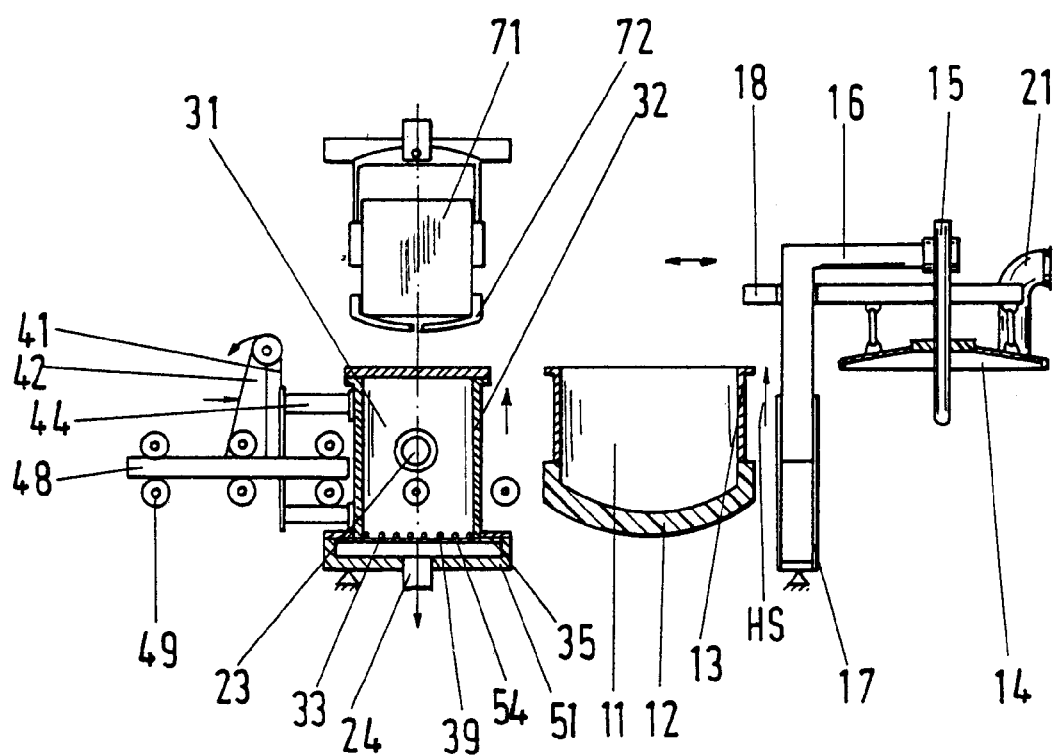
FIG. 6 shows a low shaft furnace with pivoted cover and charging container with a device for moving and lifting purposes during the filling phase.

In FIG. 2, the charging container is filled by a scrap basket 71 which has a base shutter 72 (FIG. 6). During the filling operation, the transition from the top part 32 to the bottom part 34 is closed by a single-armed lever. The levers 37 can be pivoted about the shafts 36 and are supported on a damping element 61 during the filling operation. In the present case, said damping element 61 comprises a swing-action arm 63 and a spring 62.

The mouth of the bottom part 34 is set down on a bearing means 51. Projecting into the free space of the bearing means 51 are lances 53 through which it is possible to feed gases if said space is used as an afterburning chamber.

Figure 3:
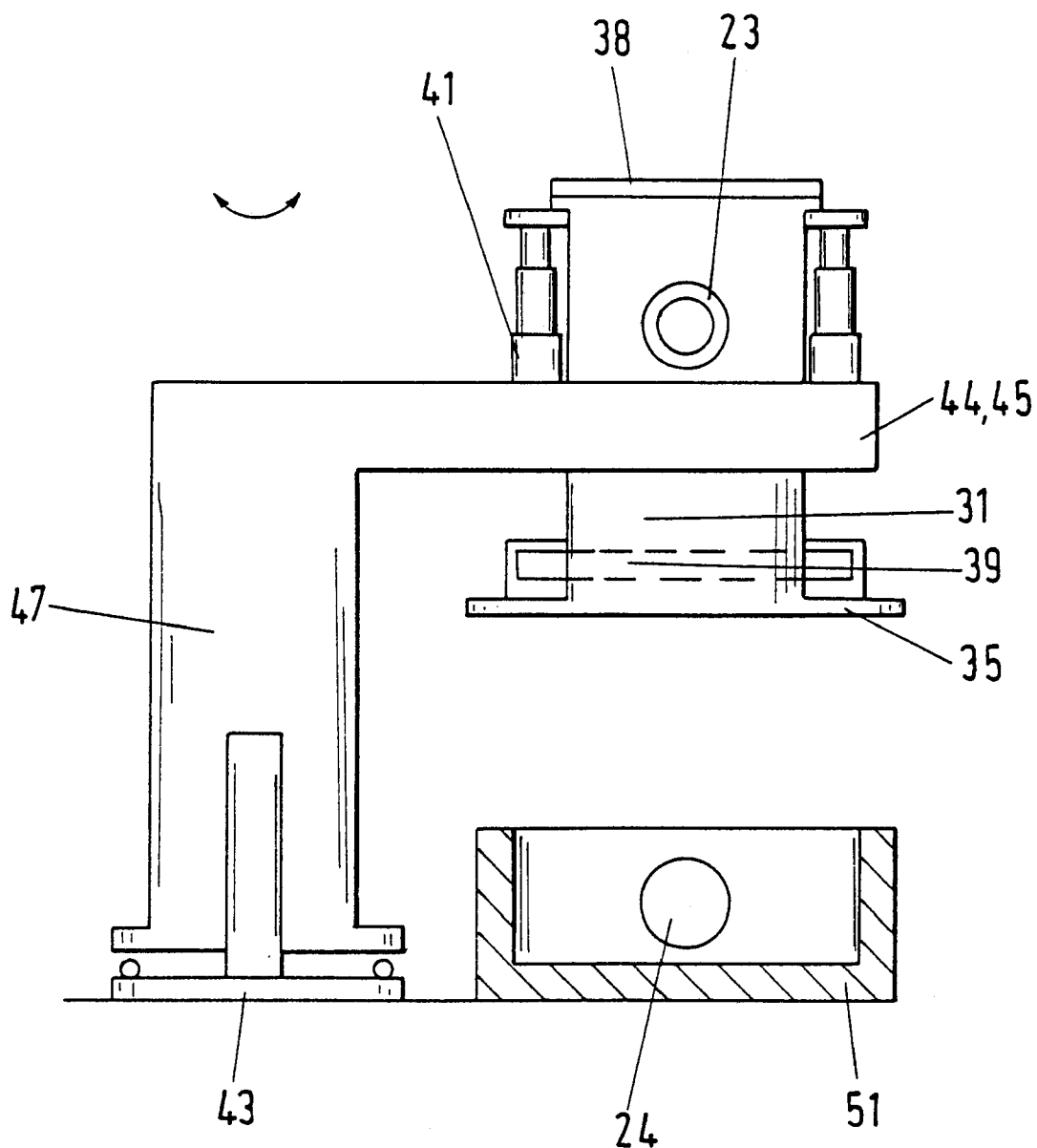
FIG. 3 shows a charging apparatus with a pivoting apparatus on which a lifting apparatus is arranged separately.
Figure 4:
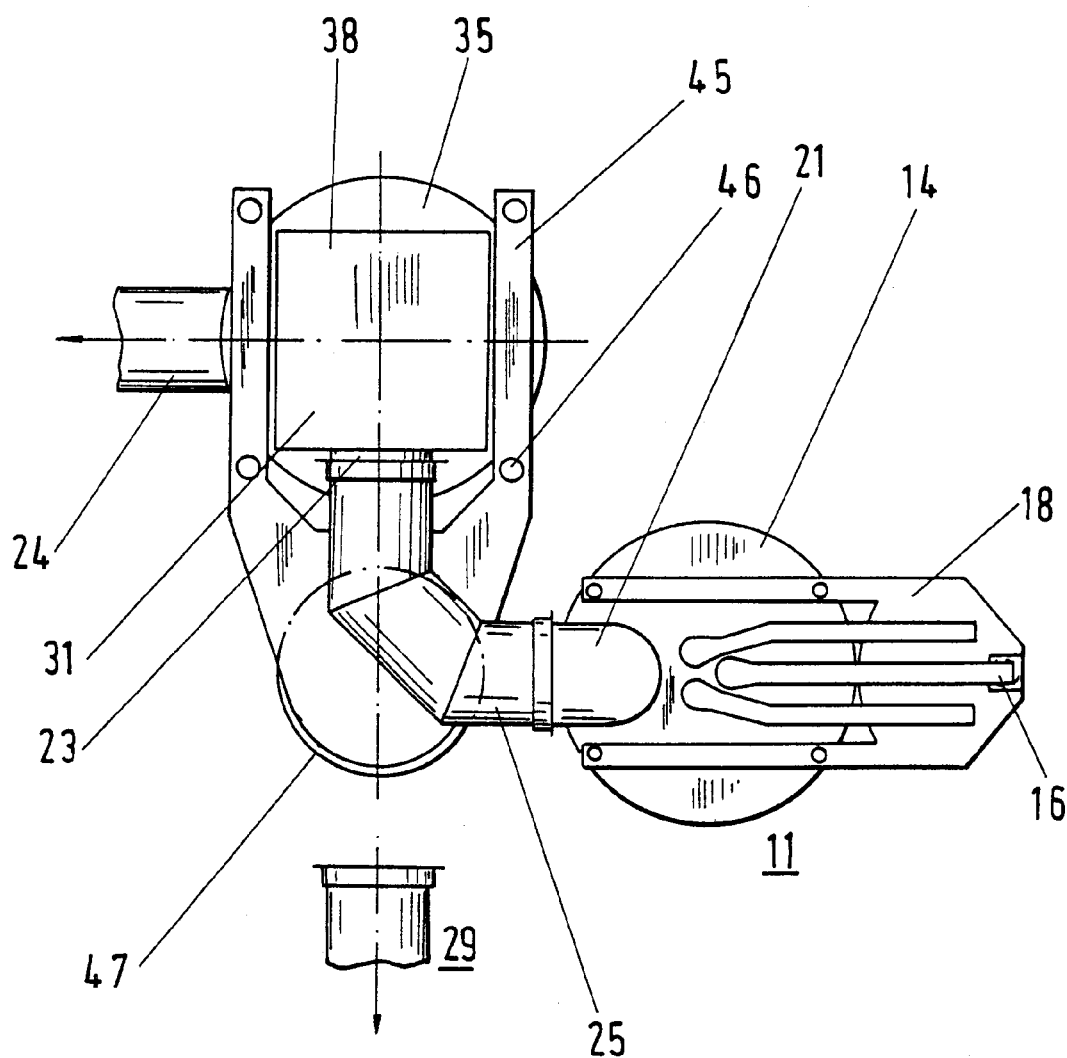
FIG. 4 shows a plan view of a pivoting apparatus with gas-channeling line parts during the operating phase.

FIG. 3 shows a central column 43 which is configured as a pivoting apparatus 47 and has gripping elements 44 which are in the form of a fork-shaped element 45 (see the following FIG. 4 in this respect). Provided on the fork-shaped element 45 are lifting apparatuses, in this case telescopic hydraulic components, by means of which the charging apparatus can be lifted and lowered.

The charging apparatus 31 is closed in a gastight manner in the upward direction by a cover 38. A feed tube 23 is arranged in the side wall of the charging apparatus 31.

Rod-shaped elements 39 are provided at the mouth of the charging container 31, right above the mouth region 35, it being possible for said elements to be moved into and out of the charging container, and the charge being supported on said elements during the preheating phase and during transport.

In FIG. 3, the charging container has been lifted up from the bearing means 51. The connection 24 is illustrated in the free space of the bearing means 51.

FIG. 4 shows a plan view of the installation as a whole. The right-hand part of the figure illustrates the low shaft furnace 11 closed by the cover 14 and projecting beyond the electrode-carrying arm 16 and the cover-lifting and -pivoting apparatus 18.

Arranged on the cover 14 is the extracting tube 21, which corresponds with a right-angled line section 25 which is fastened on the pivoting apparatus 47 and, at the other end, leads to the feed tube 23 of the charging container 31. Fastened on the pivoting apparatus 47 is the fork-shaped element 45, on which lifting elements 46 are arranged. In its top region, the charging apparatus is of rectangular configuration and is closed by a cover 38. The mouth region 35 of the charging apparatus 31 is adapted to the form of the furnace 11; in the present case it is of circular form.

The bearing means 51, from which the connection 24 leads away, cannot be seen in the present figure.

The connection of the gas-extracting device 29 is also presented.

FIG. 4 shows a single bearing position of the charging container 31. Of course, by virtue of the possibility of the pivoting apparatus 47 pivoting through 360° any desired positions are possible.

The illustrated arrangement of the furnace 11 and of the charging apparatus 31 shows the position in which the furnace is in operation and the waste gases are extracted via the charging container through the connection 24.

Not illustrated, but easily recognizable in FIG. 4, is a position of the line section 25 which, on the one hand, is connected to the extracting tube 21 of the cover 14 and, on the other hand, can be connected directly to the gas-extracting device 29. This phase can easily be set, in particular, when the furnace is in operation as a "normal" arc furnace, as hitherto conventional, and can thus be operated independently of the charging container, which may possibly be malfunctioning or be removed for repair purposes.

Figure 5:
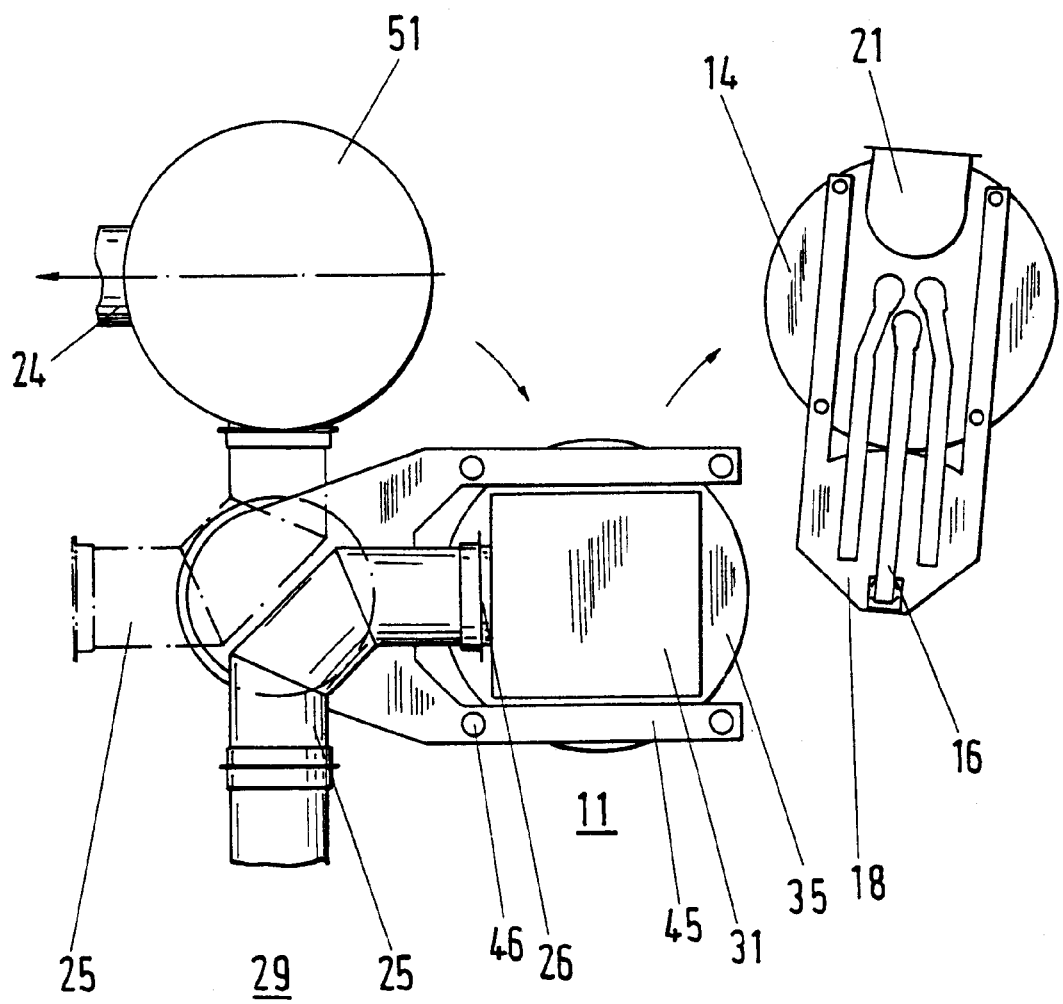
FIG. 5 shows a plan view of the furnace and feeding device during the charging operation.

FIG. 5 shows the same unit as in FIG. 4, but in this case in the position in which the charge is directed into the furnace. In the right-hand part of FIG. 5 the cover 14 has been pivoted away from the furnace 11. At the same time, the charging apparatus 31 has been lifted off from the bearing means 51 and pivoted over the furnace vessel 11.

During charging, the gas-extracting device 29 is connected, via the line section 25, to a tubular stub 26 which is arranged in the side wall of the charging apparatus 31.

A second line section 25 (dashed line) is illustrated in FIG. 5. This provides different gas-channeling circuits when using a plurality of bearing means 51, in particular for conventional furnace operation without the use of the charging apparatus.

In FIG. 6, the moving apparatus 42 is constructed from a lifting apparatus 41 with a track 48 routed between rollers 49. From the lifting apparatus 41, gripping elements 44 lead from the top part 32 of the charging apparatus 31.

A gas feed 23 is provided in the side wall of the charging apparatus 31. Rod-shaped elements 39 are provided in the mouth region 35 of the charging apparatus 31 and form the base 33 of the charging container 31.

In the present case, the rods 39 are supported on a grid 54 of the bearing means 51. This makes it possible to absorb impact during charging of the charging container 31.

In the present case, the connection 24 is arranged in the base of the bearing means 51.

In FIG. 6, the scrap basket 71 is located above the charging container 33 and has a base shutter 72 which can be opened.

The right-hand part of the figure illustrates the furnace vessel 11 with the lower vessel 12 and the upper vessel 13.

In the situation illustrated, the cover 14 has been pivoted away by the cover-lifting and -pivoting apparatus 18 including the electrode 15 fastened on the electrode arm 16, by means of the electrode column 17.

FIG. 6 shows clearly that the scrap basket 71 can be routed at an extremely low level in the steelworks workshop (not illustrated any further) since the charging apparatus 31 may be positioned at more or less any desired location alongside the furnace vessel 11.

The invention is not limited by the embodiments described above which are presented as examples only but can be modified in various ways within the scope of protection defined by the appended patent claims.

List of Designations

Smelting
11 Low shaft furnace
12 Lower vessel
13 Upper vessel
14 Cover
15 Electrode
16 Electrode-carrying arm
17 Electrode column
18 Cover-lifting and -pivoting apparatus
19 Border of upper furnace vessel
Extraction
21 Extracting tube on furnace cover
22 Sliding sleeve
23 Feed tube on the charging container
24 Bearing means connection
25 Line section (right-angled)
26 Tubular stub
29 Gas-extracting device
Charging
31 Charging apparatus
32 Top part, charging apparatus
33 Base of the charging container
34 Bottom part, charging apparatus
35 Mouth region, bottom part
36 Shaft
37 Single-armed lever
38 Cover, charging apparatus
39 Rod-shaped elements
Lifting/pivoting
41 Lifting apparatus
42 Moving apparatus
43 Central column
44 Gripping elements
45 Fork-shaped element
46 Lifting element
47 Pivoting apparatus
48 Track
49 Rollers
Bearing means
51 Bearing means
52 Border of the bearing means
53 Lances
54 Grid
Damping
61 Damping elements
62 Spring
63 Arm
Filling
71 Scrap basket
72 Base shutter
$L_m$ Lateral-surface length of bearing means 51
$L_c$ Overall height of charging apparatus 31
$H_F$ Overall height of low shaft furnace 11
$H_S$ Overall height of shaft 13

What is claimed:

1. A feeding device for a low shaft furnace having an upper furnace vessel, comprising: a furnace cover connected to a gas-extracting device; a charging apparatus settable down on the furnace when the cover is removed from the furnace shaft, the charging apparatus having a top part and a bottom part, the top part being configured as a charging container which has a gas-permeable base which can be opened, the bottom part having a mouth, the bottom part being configured in a region of the mouth so as to correspond with a top border of the upper furnace vessel; bearing means on which the charging apparatus can be set down, the bearing means having a level considerably lower than that of the top border of the upper furnace vessel, the bearing means having a connection by which the bearing means is connectable to the gas-extracting device; lifting means for setting the charging apparatus down on the bearing means and lifting the charging apparatus to a height slightly above the level of the top border of the upper furnace vessel; and moving means for moving the charging apparatus toward and away from the low shaft furnace.

2. A feeding device as defined in claim 1, wherein moving apparatus is a pivoting apparatus.

3. A feeding device as defined in claim 1, wherein the bearing means has a border directed toward the charging apparatus so as to correspond with the mouth of the bottom part of the charging apparatus.

4. A feeding device as defined in claim 1, wherein the top part of the charging apparatus has a rectangular cross section.

5. A feeding device as defined in claim 4, and further comprises single-armed levers fastened in a pivotable manner on shafts provided on two opposite sides, outside an alignment of inner walls of the top part of the charging apparatus.

6. A feeding device as defined in claim 4, wherein rod-shaped elements are provided at a mouth of the cross-sectionally rectangular top part of the charging apparatus, so that said rod-shaped elements are pluggable into and drawable out of the charging apparatus.

7. A feeding device as defined in claim 1, wherein the bearing means is of tubular configuration and is fitted with lances via which it is possible to channel media by means of which afterburning of furnace gas can be carried out.

8. A feeding device as defined in claims 1, wherein the bearing means has a lateral-surface length ($L_m$) of such a magnitude that, added up with an overall height ($L_c$) of the charging apparatus set down on the bearing means, it is smaller than an overall height of the low shaft furnace.

9. A charging device as defined in claim 5, wherein the bearing means has a free space, and further comprises damping elements arranged in the free space so as to correspond with tips of the single-armed levers.

10. A feeding device as defined in claim 9, wherein the damping elements include a spring and a pivotable arm.

11. A feeding device as defined in claim 2, and further comprising a gas-channeling line section arranged on the pivoting apparatus so as to be routed, in plan view, at right angles and so as to be rotatable into positions, in which ends of the line section connect the following apparatuses to one another:

a) the low shaft furnace to the charging apparatus;

b) the low shaft furnace to the gas-extracting device;

c)+d) a free connection.

12. A feeding device as defined in claim 2, wherein the pivoting apparatus has a central column, the lifting apparatus being arranged in the central column of the pivoting apparatus, and further comprising gripping elements operatively arranged to grip and set down the charging apparatus at any desired position.

13. A feeding device as defined in claim 2, and further comprising a fork-shaped element provided on the pivoting apparatus, at least three lifting elements being arranged on the fork-shaped element by means of which the charging apparatus can be lifted and set down.

14. A feeding device as defined in claim 1, wherein a tubular stub is provided in the bottom part of the charging apparatus so that during a phase of the charging apparatus being set down on the low shaft furnace the stub can be brought into connection with the gas-extracting device.

* * * * *